United States Patent [19]

DiFazio

[11] Patent Number: 4,520,887
[45] Date of Patent: Jun. 4, 1985

[54] BATTERY HOLDDOWN ARRANGEMENT

[75] Inventor: Robert DiFazio, New York, N.Y.

[73] Assignee: D & S Plug Corporation, Deer Park, N.Y.

[21] Appl. No.: 463,979

[22] Filed: Feb. 4, 1983

[51] Int. Cl.³ .............................................. B60R 18/02
[52] U.S. Cl. ...................................... 180/68.5; 248/503
[58] Field of Search .............. 248/503, 505, 507, 508, 248/510; 180/68.5; 24/573, 279; 70/58, 461

[56] References Cited

U.S. PATENT DOCUMENTS

| | | | |
|---|---|---|---|
| 2,849,074 | 8/1958 | Key et al. | 180/68.5 |
| 2,853,143 | 9/1958 | Bergman | 180/68.5 |
| 3,298,454 | 1/1967 | Anderson et al. | 180/68.5 |
| 3,420,489 | 1/1969 | Doggett et al. | 180/68.5 |
| 3,557,895 | 1/1971 | Thomas | 180/68.5 |
| 3,866,704 | 2/1975 | Bowers et al. | 248/503 X |

*Primary Examiner*—Joseph F. Peters, Jr.
*Assistant Examiner*—Michael Mar

[57] ABSTRACT

A simple holddown structure for securely mounting a storage battery or the like is in the form of an integrally molded bracket member of corrosion-resistant material having two spaced-apart parallel angled members adapted to engage opposite upper edges of the battery and interconnected by a cross-bar member, the opposite ends of which are formed with an eyelet and an upstanding tab formation both extending beyond the angled members. The eyelet accommodates a fastener securing one side of the bracket member to a mounting structure and the tab cooperates with a separate L-shaped member having a series of apertures in one arm for selectively receiving the tab therein. The other arm of the L-shaped member has a slot accommodating a fastener for adjustably securing the other side of the bracket member to the mounting structure. In a modification, the L-shaped member may be formed in two pieces with the arms connected by a hook and aperture arrangement to permit lateral adjustment with respect to the fastener, that is, abaxially of the cross-bar member.

11 Claims, 5 Drawing Figures

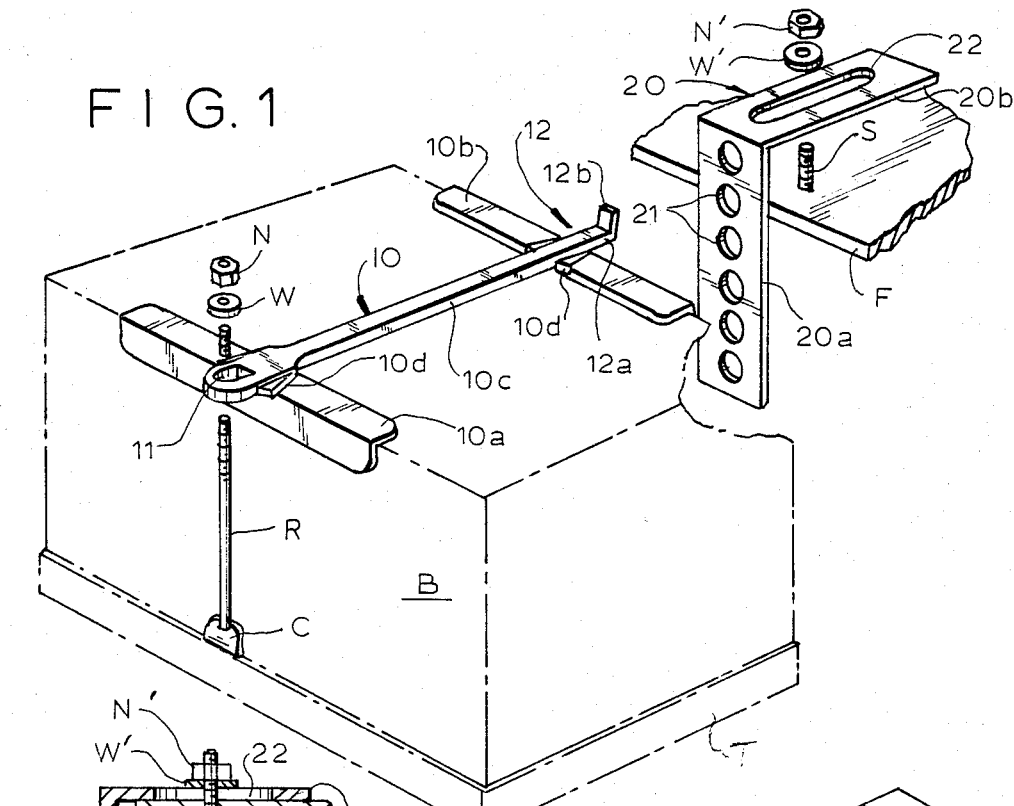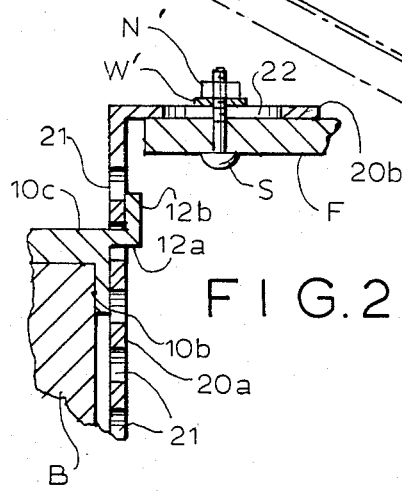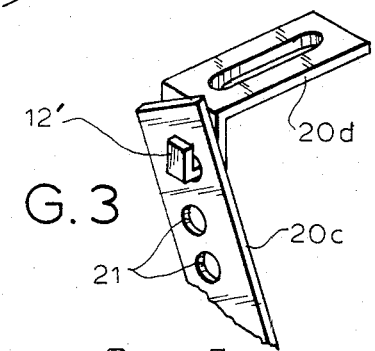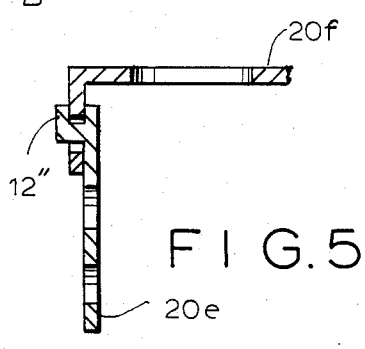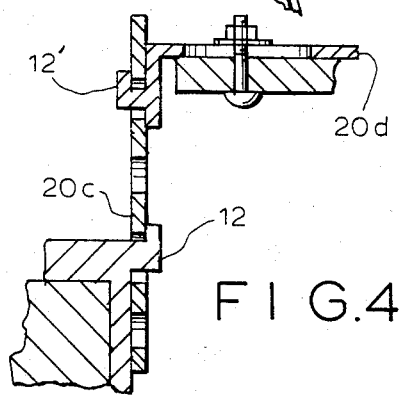

BATTERY HOLDDOWN ARRANGEMENT

BACKGROUND OF THE INVENTION

The invention relates to a securement for a storage battery or the like and more particularly to an integrally molded bracket structure for securing a battery to a mounting. Battery securing devices for securing batteries in a motor vehicle are known, reference being made in this connection, by way of example, to U.S. Pat. No. 3,866,704 to Bowers et al wherein a number of other patents are in turn referred to. A general problem with prior battery securing devices is that they are difficult and costly to construct and also difficult to assemble in diverse battery housing environs.

The present invention solves the stated problem by providing a battery holddown structure which is simple and inexpensive to manufacture, easy to assemble and disassemble and usable in vehicles with diverse mounting structures.

SUMMARY OF THE INVENTION

More specifically, and in accordance with the invention, I provide apparatus for securing a storage battery or the like to a mounting, comprising spaced apart arm means for engaging opposite upper edges of the battery; cross-bar means integrally formed and connected adjacent opposite end portions thereof to said spaced-apart arm means for bridging the upper surface of the battery; means integrally formed with and extending from one end of said cross-bar means beyond one of said arm means for enabling securement of said one of said arm means to the battery mounting; upstanding means integrally formed with and extending from the other end of said cross-bar means at a location beyond the other of said arm means for connecting the other of said arm means to the mounting; and L-shaped means for securing said upstanding means to the mounting, said L-shaped means comprising a series of apertures in one arm thereof for selectively receiving said upstanding means therein, and means in the other arm of said L-shaped means adapted to accommodate means for fixing said L-shaped means to the mounting.

The L-shaped means may be of integral construction or in a variant may be constituted of two separate relatively rotatable parts to permit an additional degree of adjustment. In one form, a slotted arm is provided with an upstanding means in the form of an extension hook similar to that on the cross-bar member that cooperates with a selected one of the apertures in the separate apertured arm permitting thereby rotation of the latter arm with respect to both hooks. Alternatively, the hook formation may be provided at the end of the separate apertured arm in which event the slotted arm has a right angle portion formed with an aperture for receiving the hook formation. In either event, with this modification, the fastening devices on the mounting structure may be laterally offset on opposite sides of a line extension of the cross-bar means.

All of the parts may be molded of a corrosion resistant material, such as glass-filled nylon, with sufficient strength to hold the battery in place. The holddown structure of the invention is simple and inexpensive to manufacture, is versatile in use and readily interchangeable with structures embodying other designs.

BRIEF DESCRIPTION OF THE DRAWINGS

FIG. 1 is a perspective view of a holddown apparatus in accordance with the present invention showing the holddown structure in a position for securing a battery within a supporting tray;

FIG. 2 is a sectional view of the parts in the upper right hand portion of FIG. 1 showing them in their assembled relation;

FIG. 3 is a perspective view of a modification of the L-shaped part shown in FIGS. 1 and 2;

FIG. 4 is a sectional view of the modification shown in FIG. 3 illustrating the parts in their assembled relation; and FIG. 5 is a sectional view of a variant of FIGS. 3 and 4.

DETAILED DESCRIPTION OF THE PREFERRED EMBODIMENT

A battery holddown structure in accordance with the present invention is illustrated in FIG. 1. The basic structure consists of two parts, a bracket member 10 and an L-shaped member 20. The bracket member 10 is preferably integrally molded of a corrosion-resistant material, particularly resistant to battery acid when the bracket is used to hold down a storage battery, and generally resistant to any hostile environment in which the structure is used. A material which has been found to be suitable for use in this regard is glass-filled nylon but other marerials may be used appropriate to its environment.

The bracket member 10 comprises two parallel members, 10a and 10b, each shown as L-shaped in cross-section, with one surface of each of the L-shaped members engaging a horizontal portion of an upper edge of a battery B and the other surface of each of the L-shaped members engaging the vertical portion of respective edges to securely contain the opposite battery edges. The L-shaped members 10a and 10b are interconnected by an integrally formed cross-bar member 10c dimensioned to bridge the top of the battery B and to ensure that the L-shaped members will engage the opposite upper edges of the battery in a secure manner. The length of the cross-bar member 10c and of the parallel members 10a and 10b will accordingly be selected to conform the bracket member to the size of the battery or other housing to be held.

The cross-bar member 10c is preferably rectangular in cross-section, its undersurface adjacent opposite end portions thereof engaging the upper horizontal surface of the L-shaped members as shown in FIG. 1. Strength reinforcing sections 10d are provided and integrally formed at the sides of the cross-bar in the region where the cross-bar engages the horizontal leg portions of the L-shaped members.

Extending from the reinforcing sections at one end of the cross-bar member 10c, beyond the L-shaped member 10a, is an eyelet 11 for accommodating a fastening device to secure that side of the bracket member 10 to a mounting structure. As shown in FIG. 1, the battery B may be disposed in a tray mounting T or receptacle which receives the lower surface of the battery for holding it against shifting movement. Such tray are typically provided with a connector C and a tie rod R having a threaded upper end. The threaded upper end serves as a fastening device for the one side of the bracket member when passed through eyelet 11 and secured by means of nut N and washer W.

Extending from the opposed end of the cross-bar member 10c, beyond L-shaped member 10b, is a portion 12a of comparable cross-section terminating in an upstanding finger or tab 12b serving as hook portion 12. The tab 12b for ease of construction is preferably generally rectangular in section with a beveled upper edge, but of thinner cross-section than portion 12a. The hook portion is advantageously used in conjunction with the L-shaped member 20 as will now be described to secure the opposite side of bracket member 10 to the mounting structure.

The L-shaped member 20, preferably molded of the same material as the bracket member 10, has one arm 20a formed with a series of apertures 21 therein, the other arm 20b having an elongate slot 22 therein. The apertures 21, exemplified as six in number, are each dimensioned to permit the tab 12b to pass therethrough and to prevent its removal when the arm 20a engages the outer surface of the vertical leg of the L-shaped angle member 10b as shown in FIG. 2. To this end, the aperture in the L-shaped member 20 is smaller than the combined vertical extent of cross-bar member portion 12a and tab 12b but larger than the vertical extent of tab 12b alone. Advantageously, the combined vertical extent of portion 12a and tab 12b is 0.400 inches, the vertical extent of the tab alone 0.213 inches and the aperture opening size 0.360 inches. The thickness of tab 12b, measured along the axis of cross-bar member 10c, is 0.140 inches and its width, measured along the length of angle member 10b, is 0.250 inches, as shown. Slot 22 is adapted to accommodate a fastening device for suitably securing member 20 to the surrounding mounting structure. The slot may, for example, have a 0.350 inch width and 1.56 length. In FIG. 1, the mounting structure is shown as the frame F or chassis of a vehicle in which the battery B is mounted and the fastening device may consist of a screw S, which is passed through frame F and slot 22, and a nut N' and washer W' that cooperate with screw S to fix arm 20b to the frame F in the manner shown in FIG. 2.

In order to operatively assemble the holddown structure of FIG. 1, the bracket member 10 is first placed on the top of battery B with the two parallel L-shaped members 10a and 10b engaging the opposite upper battery edges. The fastening device associated with the eyelet 11 then firmly secures that bracket member adjacent the eyelet and thereby that side of the battery to the mounting structure.

The L-shaped member 20 is designed to take into account variations in positioning and levels of the vehicular frames and fastening means therein. The apertures 21 to the extent they are larger than the width and thickness of portion 12a of cross-bar member 10c, enable vertical (and slight lateral) adjustment of the L-shaped member 20 relative to the frame while the slot enables alignment with a fastening means in the frame F. For mounting the L-shaped member 20 on the bracket member 10, because the apertures 21 of member 20 are smaller than the combined vertical extent of cross-bar portion 12a and tab 12b, the member 20 must first be inclined with respect to the vertical leg of bracket member 10b, to enable the tab 12b to pass through a selected one of the apertures and then rotated to clear and receive portion 12a as shown in FIG. 2. As also seen in FIG. 2, the inner face of the tab 12b, that is, the face facing L-shaped member 10b, extends a distance beyond L-shaped member 10b substantially equal to the thickness of arm 20a so that when the L-shaped mmber 20 is mounted as shown in FIG. 2, a portion of its inner surface will engage the vertical leg 10b and a portion of its outer surface will engage the inner face of the tab 12b. The aperture 21 selected for receiving the tab 12b is that which will bring arm 20b into engagement with the top of frame F. With the member 20 in the position shown in FIG. 2, the tab 12b cannot be removed from the aperture because the aperture opening is smaller than the combined extent of the portion 12a and tab 12b. Once the arm 20b is positioned for engagement with the frame F, the arm may be secured to the frame by means of the fastening device which passes through slot 22. It will be appreciated that screw S may be located in the frame anywhere along the range of slot 22 allowing thereby for variations in positioning of the screw in the frame F as a function of battery B position and the location of the fastening device on the other side of the battery. With both fastening devices securely attaching the holddown structure to the battery, as described, the battery will be firmly held in place in its tray receptacle and can be readily removed therefrom when desired simply by disconnecting the two fastening devices.

In the event that it is not possible or convenient to locate the fastening device for the L-shaped member 20 in alignment with the cross-bar member 10c, the L-shaped member may be modified to permit greater latitude in alignment with an associated fastening device by constructing it in two pieces as shown, for example, in FIG. 3. In this embodiment, the apertured arm is formed as a separate piece 20c as is also the slotted arm 20d which moreover has a right angle section provided with a hook 12' formation that is similar to the hook 12 on bracket member 10b. When assembled, hook 12 is connected in one aperture of the piece 20c and hook 12' connected to another aperture, typically the uppermost, as shown in FIG. 4 in attaching bracket member 10 to the frame F. This arrangement permits the piece 20c to be rotated about the hook 12 and the piece 20d to be maintained flat against the top of frame F. With this arrangement fastening devices which may be located out of alignment with cross-bar member 10c can be accommodated. Hence, connection of the bracket member 10 to the frame F is possible along three orthogonal axes.

As a modification of the FIG. 4 embodiment, the L-shaped member may take the form shown in FIG. 5 where the apertured piece 20e has a hook 12" formation on its end, a cooperating aperture being provided in the right angle section of slotted piece 20f.

It will be seen from the foregoing description that an improved holddown arrangement for a storage battery or the like is provided of simple and inexpensive construction, with a minimum of parts, that permit maximum freedom of adjustment and ready assembly and disassembly in a manner not found or suggested in the prior art.

What I claim is:

1. Apparatus for securing a storage battery or the like to a mounting, comprising spaced apart arm means for engaging opposite upper edges of the battery, elongate cross-bar means of rectangular cross-section integrally formed with and connected adjacent its opposite end portions to said arm means for bridging the upper surface of the battery, said arm means comprising angle brackets for engaging the upper edges of the battery and having downwardly extending portions, securing means integrally formed with the cross-bar means and extending along the longitudinal axis of the cross-bar means beyond one of said arm means for securing said one of said arm means to the battery mounting; means integrally formed with and as a longitudinal extension of the other end of said cross-bar means and terminating in an upstanding part beyond the other of said arm means for connecting the other of said arm means to said mounting; and L-shaped means for securing said upstanding part, integrally formed on the cross-bar means, to the mounting comprising: a series of vertically spaced apertures in one leg of said L-shaped means for selectively receiving said upstanding part therein; and means in the other leg of said L-shaped means adapted to accommodate means for fixing said L-shaped means to the mounting, said upstanding part having an inner face, facing said other arm means and extending a distance beyond the other arm means substantially equal to the thickness of said one leg of said L-shaped means, wherein said one leg is secured between said upstanding part and said downwardly extending portion of said other arm means when said battery is mounted and secured.

2. Apparatus as in claim 1, wherein said arm means, and, said cross-bar means, are integrally molded of a corrosion-resistant material.

3. Apparatus as in claim 2, wherein said corrosion-resistant material comprises glass-filled nylon.

4. Apparatus as in claim 1, wherein said L-shaped means is of integral construction and is molded of a corrosion-resistant material.

5. Apparatus as in claim 4, wherein said corrosion-resistant material comprises glass-filled nylon.

6. Apparatus as in claim 1, wherein said L-shaped means is a two part construction, said parts having cooperating means permitting relative movement therebetween.

7. Apparatus as in claim 6, wherein one of said parts has said series of apertures and the other part has a hook formation received in one of the apertures.

8. Apparatus as in claim 7, wherein said other part also has an elongated slot formed therein for fixing the L-shaped means to the mounting.

9. Apparatus as in claim 7, wherein said one of said parts is rotatable about the hook formation of which receives the hook formation.

10. Apparatus according to claim 6, wherein said one of said parts has a tab formation in addition to said series of apertures and the other of said parts has an elongated slot formed therein and a depending portion formed with an aperture, said tab formation on said one of said parts being received in said aperture in said depending portion.

11. Apparatus as in claim 1, wherein each of the series of apertures in said one leg of the L-shaped means is larger than the vertical extent of the upstanding part but smaller than the combined vertical extent of the integrally formed upstanding part and said other end of said cross-bar means on which said upstanding part is formed.

* * * * *